(12) United States Patent
Scott et al.

(10) Patent No.: US 10,740,987 B2
(45) Date of Patent: Aug. 11, 2020

(54) AUGMENTED REALITY SYSTEM FOR VISUALIZING NONCONFORMANCE DATA FOR AN OBJECT

(71) Applicant: The Boeing Company, Chicago, IL (US)

(72) Inventors: Jeremiah Kent Scott, Kirkland, WA (US); Robert Stephen Kanematsu Baker, Lynnwood, WA (US); Bryan James Beretta, Santa Monica, CA (US); Michael Louis Bernardoni, Santa Barbara, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/158,579

(22) Filed: Oct. 12, 2018

(65) Prior Publication Data

US 2020/0118345 A1 Apr. 16, 2020

(51) Int. Cl.
*G06T 19/00* (2011.01)
*G06T 19/20* (2011.01)
*B64F 5/60* (2017.01)

(52) U.S. Cl.
CPC .......... *G06T 19/20* (2013.01); *B64F 5/60* (2017.01); *G06T 19/006* (2013.01); *G06T 2200/24* (2013.01)

(58) Field of Classification Search
CPC .......... G06F 3/04815; G06F 16/904; G06F 17/5095; G05B 17/02; G01N 21/8803;
(Continued)

(56) References Cited

U.S. PATENT DOCUMENTS 9,881,425 B1  1/2018  Scott et al.
2012/0075343 A1*  3/2012  Chen ............... G09G 5/397
                                                345/633
(Continued)

FOREIGN PATENT DOCUMENTS

EP  2728548 A1  5/2014
EP  2998909 A1  3/2016

OTHER PUBLICATIONS

Extended European Search Report, dated Mar. 11, 2020, regarding Application No. 19202809.0, 15 pages.
(Continued)

*Primary Examiner* — Diane M Wills
(74) *Attorney, Agent, or Firm* — Yee & Associates, P.C.

(57) ABSTRACT

A method, apparatus, and system for visualizing nonconformance data for a physical object. An augmented reality application in a portable computing device plots, in a defined coordinate cube, points corresponding to nonconformance locations on the physical object. The augmented reality application determines a sub-set of the points plotted that correspond to a region of the physical object visible in an image of the region of the physical object acquired by the portable computing device at a position of the portable computing device, where the sub-set of the points exclude nonconformance locations occluded from view by a physical object structure of the physical object in the image. The augmented reality application displays the nonconformance data for the sub-set of the points visible in the image in association with a sub-set of the nonconformance locations for the physical object in the image displayed on a display system in the portable computing device.

24 Claims, 11 Drawing Sheets

(58) Field of Classification Search
CPC ......... G01N 21/8806; G06Q 10/06395; G06Q 10/20; G06T 19/00; G06T 19/003; G06T 19/006; G06T 19/20
See application file for complete search history.

(56) References Cited

U.S. PATENT DOCUMENTS

| | | |
|---|---|---|
| 2014/0022281 A1* | 1/2014 | Georgeson ............ G06F 3/1454 345/633 |
| 2015/0279103 A1 | 10/2015 | Naegle et al. |
| 2016/0085426 A1 | 3/2016 | Scott |
| 2016/0104276 A1 | 4/2016 | Engel |
| 2016/0339652 A1* | 11/2016 | Safai ................... B24B 49/12 |
| 2016/0379409 A1 | 12/2016 | Gavriliuc |
| 2017/0069143 A1* | 3/2017 | Salter ................... G06F 3/013 |
| 2017/0084085 A1 | 3/2017 | Solorio |
| 2018/0107269 A1* | 4/2018 | Benzies ............... G06T 15/506 |
| 2018/0150070 A1* | 5/2018 | Johnson ................ G06F 21/31 |

OTHER PUBLICATIONS

Ababsa et al., "Software Architecture and Calibration Framework for Hybrid Optical IR and Vision Tracking System," 2007 Mediterranean Conference on Control and Automation, Jul. 27-29, 2007, 6 pages.
Caudel et al., "Augmented Reality: an Application of Heads-Up Display Technology to Manual Manufacturing Processes," Proceedings of the Twenty-Fifth Hawaii International Conference on System Sciences, 1992, pp. 659-669.

\* cited by examiner

AUGMENTED REALITY SYSTEM FOR VISUALIZING NONCONFORMANCE DATA FOR AN OBJECT

BACKGROUND INFORMATION

1. Field

The present disclosure relates generally to manufacturing aircraft and in particular, to a method, apparatus, and system visualizing nonconformance data for an aircraft in a phase of manufacture.

2. Background

In manufacturing aircraft, many inspections are performed during different phases of the manufacturing. The inspection can be performed by automated equipment, a human operator, or some combination thereof. For example, a human operator may visually inspect an aircraft or aircraft structure for nonconformances. The aircraft structure can be, for example, a fuselage section, an engine housing, a wing, or some other structure for an aircraft. The nonconformance can be, for example, a crack, a scratch, a delamination, an incorrect dimension, an incorrect color, or some other feature that is incorrect.

Further, the human operator also may touch areas in question of the aircraft structure to verify the physical condition of the aircraft structure. The human operator may also use tools such as an eddy current tester, an ultrasound machine, or other tools to inspect the aircraft structure.

When a location with a nonconformance is found on an aircraft structure, the location is physically marked with a physical marker, such as a piece of tape or a quick response (QR) code. In either case, a physical marker is placed on the aircraft structure at the location of the nonconformance.

Further, the human operator also may note the location description of the area that requires rework. Physical makers and notes about nonconformances are logged in a three-ring binder or notebook. For example, the location and an identifier for the physical note may be logged in the three-ring binder.

This information is also entered into a database such that a work order can be created to resolve the nonconformance. The human operator or another human operator can later use the work order to find the location of the physical tag for the nonconformance and perform work needed to resolve the nonconformance.

This type of inspection process is time consuming and inefficient. Therefore, it would be desirable to have a method and apparatus that take into account at least some of the issues discussed above, as well as other possible issues. For example, it would be desirable to have a method and apparatus that overcome a technical problem with efficiently identifying and resolving nonconformances of an aircraft.

SUMMARY

An embodiment of the present disclosure provides an augmented reality system for visualizing nonconformance data for a physical object in which the augmented reality system comprises a portable computing device, a scan application, a modeling application, a localization application, and an augmented reality application. The portable computing device has sensor system and a display system. The portable computing device is configured to generate scan data describing points in space for the physical object at a phase of manufacture. The scan application, when executed, generates a point cloud representation of a surface profile of a region of the physical object using the scan data. The modeling application, when executed, generates a model of the region of the physical object in a defined coordinate cube using the point cloud representation for the region of the physical object. The localization application, when executed, localizes the portable computing device with the model of the region of the physical object in the defined coordinate cube based on a location target, and identifies a position of the portable computing device with respect to the physical object. The augmented reality application, when executed, plots points in the defined coordinate cube corresponding to nonconformance locations on the physical object; determines a sub-set of the points plotted in the defined coordinate cube that are visible in an image of the region of the physical object acquired by the portable computing device where the sub-set excludes plotted points determined to be located beyond the physical object structure when viewed at the position of the portable computing device; and displays the nonconformance data for the sub-set of the points visible in the image in association with a sub-set of the nonconformance locations for the physical object in the image displayed on the display system in the portable computing device.

Another illustrative embodiment provides an augmented reality system for visualizing nonconformance data for a physical object, the augmented reality system comprises a portable computing device and an augmented reality application. The portable computing device is configured to acquire an image of a physical object. The augmented reality application, when executed by the portable computing device, plots points in a defined coordinate cube, wherein the points corresponding to nonconformance locations on the physical object; determines a sub-set of the points plotted in the defined coordinate cube that correspond to a region of the physical object that is visible in an image acquired by the portable computing device at a position of the portable computing device, wherein the sub-set of the points exclude nonconformance locations that are occluded from view by a structure of the physical object in the image; and displays the nonconformance data for the sub-set of the points visible in the image in association with a sub-set of the nonconformance locations for the physical object in the image displayed on a display system in the portable computing device.

Yet another illustrative embodiment provides a method for visualizing nonconformance data for a physical object. An augmented reality application in a portable computing device plots, in a defined coordinate cube, points corresponding to nonconformance locations on the physical object. The augmented reality application in the portable computing device determines a sub-set of the points plotted in the defined coordinate cube that correspond to a region of the physical object that is visible in an image of the region of the physical object acquired by the portable computing device where the sub-set excludes plotted points determined to be located beyond the physical object structure when viewed at a position of the portable computing device, where the sub-set of the points exclude nonconformance locations that are occluded from view by a structure of the physical object in the image. The augmented reality application in the portable computing device displays the nonconformance data for the sub-set of the points visible in the image in association with a sub-set of the nonconformance locations for the physical object in the image displayed on a display system in the portable computing device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
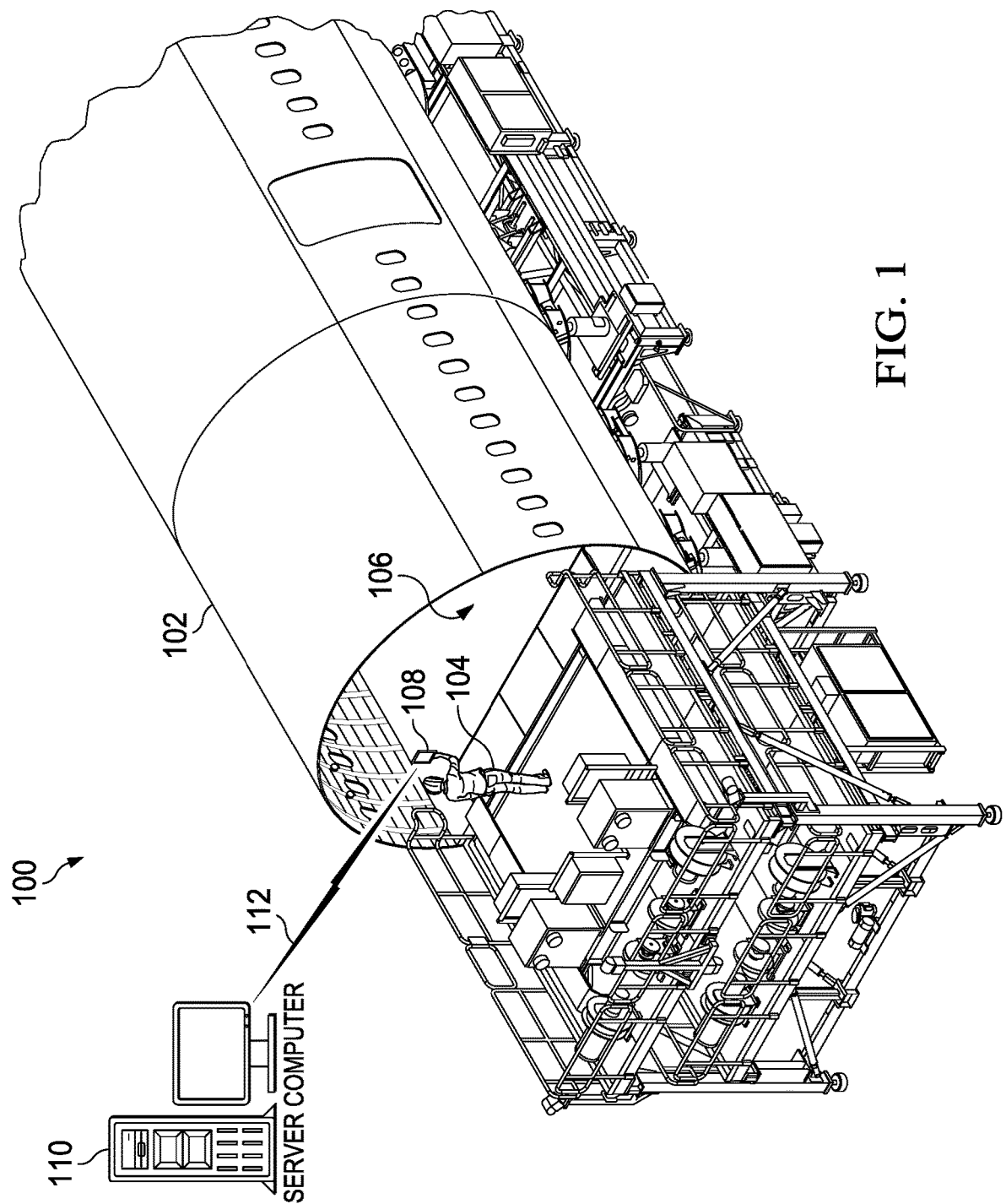
FIG. 1 is an illustration of an aircraft manufacturing environment in accordance with an illustrative embodiment.

The illustrative embodiments recognize and take into account one or more different considerations. For example, the illustrative embodiments recognize and take into account that currently used techniques to inspect vehicles, such as aircraft, take more time and effort than desired using physical and paper notes. The illustrative embodiments also recognize and take into account that currently used techniques for inspecting aircraft employ a disjointed collection of processing systems without accurate metrics and measures for gathering information about nonconformances.

The illustrative embodiments recognize and take into account that a process can be employed that provides an augmented reality experience for the human operator performing the inspection. In one illustrative example, the process identifies a position of a portable inspection device within the vehicle. A user input is received in which the user input comprises a group of gestures made by a human operator with respect to an item in a group of items in a field of view of the portable inspection device based on the position of the mobile inspection device. A note is created at a location with respect to the vehicle in association with the item in the group of items in the field of view of the portable inspection device in which the note is assigned to the location. The note is displayed in association with the item in the field of view on the graphical user interface on a display system for the mobile inspection device.

When this type of process is used during inspections to identify nonconformances for an object, such as an aircraft, resolving these nonconformances can be performed more efficiently with an augmented reality system. The illustrative embodiments recognize and take into account that human operators can locate nonconformances without relying on physical markers. As result, more efficient inspections can be performed.

In one illustrative example, an augmented reality system is used to visualize nonconformance data for a physical object. The augmented reality system comprises a portable computing device and an augmented reality application. One example of an augmented reality application software that may be utilized and configured for implementation in accordance with the present disclosure is Vuforia™ augmented reality software developed by Vuforia and PTC Incorporated. The portable computing device is configured to acquire an image of a physical object. The augmented reality application plots points in a coordinate cube, wherein the points correspond to nonconformance locations on the physical object.

The augmented reality application determines a sub-set of the points plotted in the coordinate cube that correspond to the region of the physical object that is visible in an image acquired by the portable computing device at a position of the portable computing device. The sub-set of points exclude nonconformance locations that are occluded from view by a structure of the physical object in the acquired image. The augmented reality application displays the nonconformance data for the sub-set of points visible in the image in association with a sub-set of the nonconformance locations for the physical object in the image displayed on the display system in the portable computing device.

With reference now to the figures and, in particular, with reference to FIG. 1, an illustration of an aircraft manufacturing environment is depicted in accordance with an illustrative embodiment. In this example, aircraft manufacturing environment 100 includes fuselage section 102. As depicted, human operator 104 walks through interior 106 to perform inspection of fuselage section 102 in a current phase of manufacture.

In this illustrative example, human operator 104 carries tablet computer 108, which is a type of portable computing device. Tablet computer 108 enables human operator 104 to visualize locations of nonconformances for fuselage section 102. As depicted, the locations of nonconformances are locations within interior 106 that can be seen based on the position of tablet computer 108. In this illustrative example, position comprises the location of tablet computer 108 in three-dimensional space and the orientation of tablet computer 108. In other words, tablet computer 108 can be pointed in different directions by human operator 104 to display images of interior 106 of fuselage section 102 to human operator 104.

In this illustrative example, the images displayed on tablet computer 108 are for a live view of interior 106 of fuselage section 102. Nonconformance data can be displayed on the live view to provide an augmented reality display. The nonconformance data can be displayed by overlay over the live view of fuselage section 102 using an augmented reality application running on tablet computer 108. A live view is a view of interior 106 of fuselage section 102 while tablet computer 108 is in or near interior 106 of fuselage section 102. In other words, images of interior 106 of fuselage section 102 are generated and augmented with overlaid nonconformance data. As tablet computer 108 changes position, the image changes to show the view from the current position of tablet computer 108. The images for live view can be displayed as a video in real time. In other words, human operator 104 can see what is currently in the view the camera of tablet computer 108.

As depicted, tablet computer 108 includes a sensor system that is configured to generate scan data describing points in space for fuselage section 102. The sensor system can include at least one of a camera, a stereo camera, a laser scanner, or some other suitable type of device that can generate scan data.

This scan data (or image data acquired by a camera or sensor) can be sent to server computer 110 using wireless communications link 112. In this illustrative example, tablet computer 108 and server computer 110 form an augmented reality system.

As depicted, server computer 110 processes the scan data to generate a point cloud representation of the surface profile of a region of fuselage section 102, which generally corresponds to the same fuselage section in the live view. Further, server computer 110 generates a model of the region of fuselage section 102 using the point cloud representation.

In this illustrative example, tablet computer 108 (and its position relative to fuselage section 102) can be localized with the model of the region of fuselage section 102. Further, the position (and orientation) of tablet computer 108 with respect to fuselage section 102 can be identified through a localization technique, where the orientation may be the direction in which tablet computer 108 is aimed. The localization and the position can be identified using currently available techniques for simultaneous localization and mapping (SLAM) that enables constructing or updating a map of aircraft manufacturing environment 100 while simultaneously tracking the position of tablet computer 108 within this environment as tablet computer 108 is moved.

The localization can be performed using an identifiable reference point for fuselage section 102. This reference point can be a location target that is identified or recognized by the simultaneous location and mapping process. The location target can be in an object or structure on fuselage section 102, such as a reflective target disposed on a surface of fuselage section 102 that is identifiable via a camera image, a laser scan or other suitable detection means. For example, the target location can be a doorway, a monument, a window, an anchor plate, or some other structure or feature on fuselage section 102 with a known location with respect to a model of fuselage section 102.

The location target enables tablet computer 108 to correlate the position of the location target with a corresponding position in a model of fuselage section 102. This identification enables tablet computer 108 to determine the location of tablet computer 108 relative to the location target that has a known location, and further to localize itself with respect to fuselage section 102 and the model of the fuselage section 102.

In this illustrative example, server computer 110 can plot points (which may be retrieved from a nonconformance database, for example) that are within the coordinate cube corresponding to nonconformance locations on fuselage section 102. Server computer 110 can also determine which points for the nonconformance locations are visible in the image of fuselage section 102 displayed on tablet computer 108. These determined visible points are displayed in the image to augment the view seen by human operator 104. As depicted, other plotted points that are determined to be obscured from the view in the image, based on the position of tablet computer 108 with respect to the point cloud representation and generated model associated with the region of the fuselage section 102, are not displayed on image displayed by tablet computer 108.

Thus, tablet computer 108 provides an augmented reality view to human operator 104 that enables human operator 104 to visualize locations where nonconformances are present in fuselage section 102.

Further, human operator 104 can also operate tablet computer 108 to input, mark or record new identified nonconformance locations. The illustration of aircraft manufacturing environment 100 in FIG. 1 is provided as an example of one implementation for an augmented reality system and not meant to limit the manner in which other augmented reality systems can be implemented. For example, one or more of the different operations described as being performed by server computer 110 can be formed by tablet computer 108 depending on the amount of processing resources available on tablet computer 108. Further, tablet computer 108 can be used to visualize nonconformance data for other objects other than fuselage section 102. For example, other objects can include a completed aircraft, a wing, an automobile, a train, a building, or some other suitable structure for which visualization of nonconformance data is desired.

Figure 2:
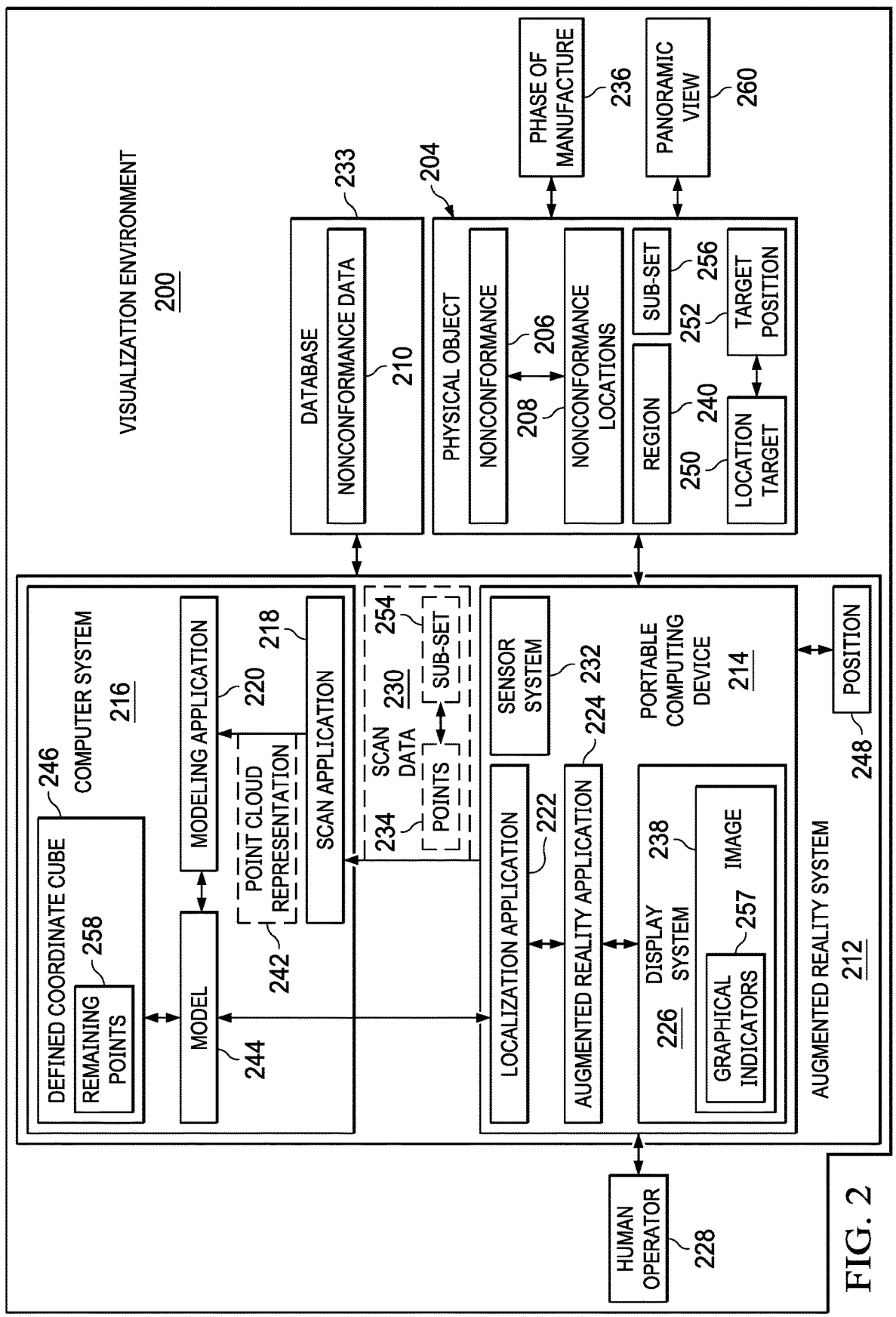
FIG. 2 is an illustration of a block diagram of a visualization environment in accordance with an illustrative embodiment.

With reference now to FIG. 2, an illustration of a block diagram of a visualization environment is depicted in accordance with an illustrative embodiment. Visualization environment 200 is an environment in which information for physical object 204 can be visualized. In this illustrative example, physical object 204 can have a number of nonconformances 206 at a number of nonconformance locations 208. As used herein, a "number of" when used with reference to items means one or more items. For example, a number of nonconformances 206 is one or more nonconformances 206.

In this illustrative example, a nonconformance is when a part of the physical object 204 deviates from a specification, standard, or some other rule. In this illustrative example, the specification, standard, or some other rule can be from a government agency, the Federal Aviation Administration, a manufacturer, a maintenance provider, an association, or some other suitable source. The standard contains rules regarding at least one of performance, safety, aesthetics, or other factors.

As depicted, physical object 204 can take a number of different forms. For example, physical object 204 is selected from a group comprising a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, an aircraft structure, a wing, a fuselage section, an engine housing, an engine, a composite panel, a wall, a skin panel, a chair, and other suitable objects.

As depicted, nonconformance data 210 for physical object 204 can be visualized using augmented reality system 212. In this illustrative example, augmented reality system 212 includes a number of different components. As depicted, augmented reality system 212 comprises portable computing device 214, computer system 216, scan application 218, modeling application 220, localization application 222, and augmented reality application 224.

Computer system 216 is a physical hardware system and includes one or more data processing systems. When more than one data processing system is present in computer system 216, those data processing systems are in communication with each other using a communications medium. The communications medium can be a network. The data processing systems can be selected from at least one of a computer, a server computer, a tablet computer, or some other suitable data processing system.

As depicted, portable computing device 214 is a data processing system that includes display system 226 for use in visualizing nonconformance data 210. Portable computing device 214 has at least one of a size, weight, or shape that is configured to be carried by human operator 228. Portable computing device 214 can be and held or worn by human operator 228.

Portable computing device 214 can take a number of different forms. For example, portable computing device 214 can be selected from a group comprising a mobile phone, a tablet computer, a head mounted device, smart glasses, and other suitable devices.

In this illustrative example, portable computing device 214 is configured to generate scan data 230 using sensor system 232 in portable computing device 214.

As depicted, nonconformance data 210 is located in the database 233. Database 233 is in a remote location to augmented reality system 212 in this illustrative example. In other illustrative examples, database 233 can be located in computer system 216.

In this depicted example, scan data 230 describes points 234 for physical object 204 at phase of manufacture 236. Phase of manufacture 236 can be selected from a group comprising a structure phase, a wing-body join, a final-body join, systems installation, interiors installation, a flight test, and other suitable phases. In this illustrative example, image 238 of region 240 of physical object 204 is generated using sensor system 232 in portable computing device 214.

As depicted, image 238 of region 240 of physical object 204 is displayed on display system 226 in portable computing device 214. In this illustrative example, image 238 of region 240 is a live view of physical object 204 as seen using portable computing device 214. As portable computing device 214 moves, new images can be generated and displayed on display system 226 in portable computing device 214. New images show the current view of the physical object 204. Images of physical object 204 can be generated periodically in real time and displayed as a video on display system 226.

In this illustrative example, sensor system 232 is a physical sensor system that includes a number of components. For example, sensor system 232 can include at least one of a three-dimensional scanner, a camera, a global positioning system receiver, structured light three-dimensional scanner, a lidar system, a laser scanner, a conoscopic holograph system, a time of flight three-dimensional scanner, or other suitable types of sensors.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

A laser scanner can scan physical object 204 to generate scan data 230. The camera can generate image 238 of region 240 of physical object 204.

Portable computing device 214 sends scan data 230 to computer system 216. In this illustrative example, portable computing device 214 is in communication with computer system 216. The communication can be facilitated using a communications media such as a network, a wireless communications link, a wired communications link or using some other suitable media.

Scan application 218 in computer system 216 is software. When scan application 218 is executed by computer system 216, scan application 218 generates point cloud representation 242 for region 240 of physical object 204 using scan data 230. In this illustrative example, scan application 218 places points 234 in scan data 230 that are detected in region 240 of the physical object 204 into point cloud representation 242.

Point cloud representation 242 can be imported into a modeling application to create a three-dimensional model. In this illustrative example, modeling application 220 in computer system 216 is software that generates model 244 from point cloud representation 242. Model 244 is a three-dimensional model and can be for example, a computer aided design (CAD) model, a computer aided manufacturing (CAM) model, or some other suitable model. In this example, modeling application 220 can generate model 244 of the region 240 of physical object 204 in defined coordinate cube 246 using point cloud representation 242 for region 240 of physical object 204.

In this illustrative example, localization application 222 in portable computing device 214 is software that localizes portable computing device 214 with model 244 generated from point cloud representation 242 of the surface profile of region 240 of physical object 204 in defined coordinate cube 246 based on location target 250, and identifies position 248 of portable computing device 214 with respect to physical object 204. In this example, localization application 222 can implement currently available techniques for simultaneous localization and mapping (SLAM) that enables constructing or updating a map of aircraft manufacturing environment 100 while simultaneously tracking the position 248 of portable computing device 214 within visualization environment 200. In this illustrative example, position 248 of portable computing device 214 is a location of portable computing device for 214 in three-dimensional space and an orientation of portable computing device 214.

In one illustrative example, in localizing portable computing device 214 with model 244, localization application 222 locates location target 250 for physical object 204. Localization application 222, uses the target position 252 of location target 250 to localize portable computing device 214 with model 244 of the region 240 of physical object 204 in defined coordinate cube 246 and identifies position 248 of portable computing device 214 with respect to physical object 204.

In this illustrative example, location target 250 is a physical feature. Location target 250 can be, for example, a plate, a barcode, a radio frequency identifier (RFID) device, an anchor, a spatial anchor, anchor plates, or some other suitable structure. Location target 250 is in a known location on physical object 204 and has a corresponding location in model 244 representing physical object 204. The location is in three dimensions and can be target position 252 if an orientation of location target 250 is also known.

The position of location target 250 can be correlated with the corresponding location in model 244 to identify the position 248 of portable computing device 214 with respect to physical object 204. Location target 250 can be used by localization application 222 as a reference to display and/or overlay the augmented reality information by augmented reality application 224 in portable computing device 214 with a desired level of accuracy on a live view of physical object 204 in captured image 238 and displayed on display system 226 in portable computing device 214. In this example, position 248 of portable computing device 214 can be more accurately determined by localization application 222 with the use of location target 250.

As depicted, augmented reality application 224 is located in portable computing device 214. In this example, augmented reality application 224 plots points 234 in defined coordinate cube 246 corresponding to nonconformance locations 208 on physical object 204. Augmented reality application 224 determines sub-set 254 of points 234 plotted in defined coordinate cube 246 that are visible in image 238 of region 240 of physical object 204 acquired by portable computing device 214 at position 248 of portable computing device 214.

In this illustrative example, in determining sub-set 254 of points 234 plotted in defined coordinate cube 246 that are visible in image 238, augmented reality application 224 determines which of points 234 plotted within defined coordinate cube 246 for nonconformance locations 208 are located at a predetermined distance beyond a physical object structure in image 238 which are occluded from a view from portable computing device 214 at position 248, such as location that are determined to be beyond the physical object structure (based on the model/point cloud representation) when viewed at the position of portable computing device 214.

For example, where a determined distance between a given nonconformance location and the location of portable computing device 214 is determined to be greater than the distance of the physical object structure from portable computing device 214, such a nonconformance location is potentially beyond the physical object structure viewed from the position of the portable computing device. In another example, where portable computing device 214 is located within an interior space of a physical object structure and oriented towards a portion of the physical object structure, and a given nonconformance location and is determined to be located outside of the interior space based on a comparison of the nonconformance location and the model representation of the physical object structure, such a nonconformance location is beyond the physical object structure as viewed from the position of portable computing device 214. These points that are the predetermined distance beyond the physical object structure are excluded from sub-set 254 of points 234.

In one illustrative example, physical object 204 is an aircraft, and the physical object structure is an aircraft structure. Augmented reality application 224 determines which ones of remaining points 258 in defined coordinate cube 246 for nonconformance locations 208 are to be occluded by determining a distance of each nonconformance location from the aircraft structure displayed that is beyond the predetermined distance that corresponds to a nonconformance location being occluded from view.

Augmented reality application 224 displays nonconformance data 210 for sub-set 254 of points 234 visible in image 238 in association with sub-set 256 of nonconformance locations 208 for physical object 204 in image 238 displayed on display system 226 in portable computing device 214. In this example, nonconformance data 210 for sub-set 254 of points 234 is live nonconformance data. In other words, this nonconformance data reflects nonconformances that are still present in physical object 204. In other words, these live nonconformances have not been resolved.

In this illustrative example, wherein in displaying the nonconformance data 210, augmented reality application 224 displays nonconformance data 210 for sub-set 254 of points 234 visible in image 238 in association with sub-set 256 of nonconformance locations 208 for physical object 204 in image 238 displayed on display system 226 in portable computing device 214 without displaying nonconformance data 210 for nonconformance locations 208 that are occluded from view in image 238 of region 240 of physical object 204. For example, if a nonconformance location is located on a surface of physical object 204 that is not visible in image 238, that nonconformance location is considered occluded and not displayed.

As depicted, the display of at least one of points 234, nonconformance data 210, or other information for nonconformance locations 208 that are visible to portable computing device 214 at position 248 is performed using graphical indicators 257. A graphical indicator in graphical indicators 257 can include at least one of an icon, a pictogram, an ideogram, a graphic, an image, text, animation, bolding, a graph, a line, an arrow, or other suitable graphic.

In this manner, the augmentation of image 238 with nonconformance data 210 is made with respect to portions of physical object 204 that can be seen by human operator 228 in image 238. As human operator 228 moves with portable computing device 214, position 248 of portable computing device 214 changes. This change in position 248 can change which surfaces are visible, which can affect the display of nonconformance data 210. In this manner, the augmented view of physical object 204 can change dynamically as position 248 of portable computing device 214 changes with respect to physical object 204.

In another illustrative example, points 234 for all nonconformance locations 208 can be displayed including visible and occluded nonconformance locations. Such feature can be useful for panoramic view 260 of physical object 204. For example, augmented reality application 224 can determine whether portable computing device 214 is greater than a selected distance for panoramic view 260 and displays points 234 for all of nonconformance locations 208 in defined coordinate cube 246 to provide panoramic view 260 of all of the nonconformance locations 208.

Further, augmented reality application 224 can also filter nonconformance data 210 based on time information to display at least one of historical nonconformance data or active nonconformance data. Historical nonconformance data is nonconformance data for at least one of physical object 204 or other instances of physical object 204. Historical data for nonconformances can include nonconformances that have already been resolved or reworked. The filtering can be for a specific period of time. Active nonconformance data is nonconformance data 210 for physical object 204 that has not yet been resolved this illustrative example.

In another illustrative example, the filtering can be performed for nonconformance data 210 for other physical objects of the type. Thus, a view of nonconformances 206 can be viewed for multiple physical objects. These physical objects of the same time can be for physical objects manufactured in the same facility or line. In another example, nonconformances 206 can be viewed from multiple physical objects maintained at the same maintenance facility.

At least one of scan application 218, modeling application 220, localization application 222, or augmented reality application 224 can be implemented in software, hardware, firmware or a combination thereof. When software is used, the operations performed by these components can be implemented in program code configured to run on hardware, such as a processor unit. When firmware is used, the operations performed by these components can be implemented in program code and data and stored in persistent memory to run on a processor unit. When hardware is employed, the hardware may include circuits that operate to perform the operations in these components.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with efficiently identifying and resolving nonconformances of an aircraft. As a result, one or more technical solutions may provide a technical effect augmenting a live view of physical object 204 in image 238 to provide human operator 228 with a visualization of nonconformance locations 208 that are visible and not occluded in the view in image 238.

Computer system 216 and portable computing device 214 can be configured to perform at least one of the steps, operations, or actions described in the different illustrative examples using software, hardware, firmware or a combination thereof. As a result, at least one of computer system 216 or portable computing device 214 operate as a special purpose computer system in which the different applications in these components enable visualizing nonconformance data 210 in an augmented view of physical object 204. In particular, augmented reality application 224 transforms computer system 216 or portable computing device 214 into a special purpose computer system as compared to currently available general computer systems that do not have augmented reality application 224.

In this manner, tablet computer 108 enables human operator 104 to view nonconformance data for fuselage section 102 using point cloud generation, simultaneous location and mapping processes, and a database of nonconformance data.

The illustration of visualization environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, another component such as an interface can be present in augmented reality system 212. The interface can be configured to receive nonconformance locations 208 on physical object 204. The interface can provide communications with database 233 of nonconformance data 210 in these illustrative examples.

Additionally, some of the components illustrated as being located in computer system 216 can be implemented in other components. For example, scan application 218 can be located in portable computing device 214 instead of a computer system 216 in some illustrative examples.

In another illustrative example, localization application 222 can be located in computer system 216 instead portable computing device 214 or in addition to portable computing device 214 as a distributed process. Thus, computer system 216 can include at least one of scan application 218, modeling application 220, localization application 222, or augmented reality application 224. Augmented reality device 214 can include at least one of include at least one of scan application 218, modeling application 220, localization application 222, or augmented reality application 224.

Figure 3:
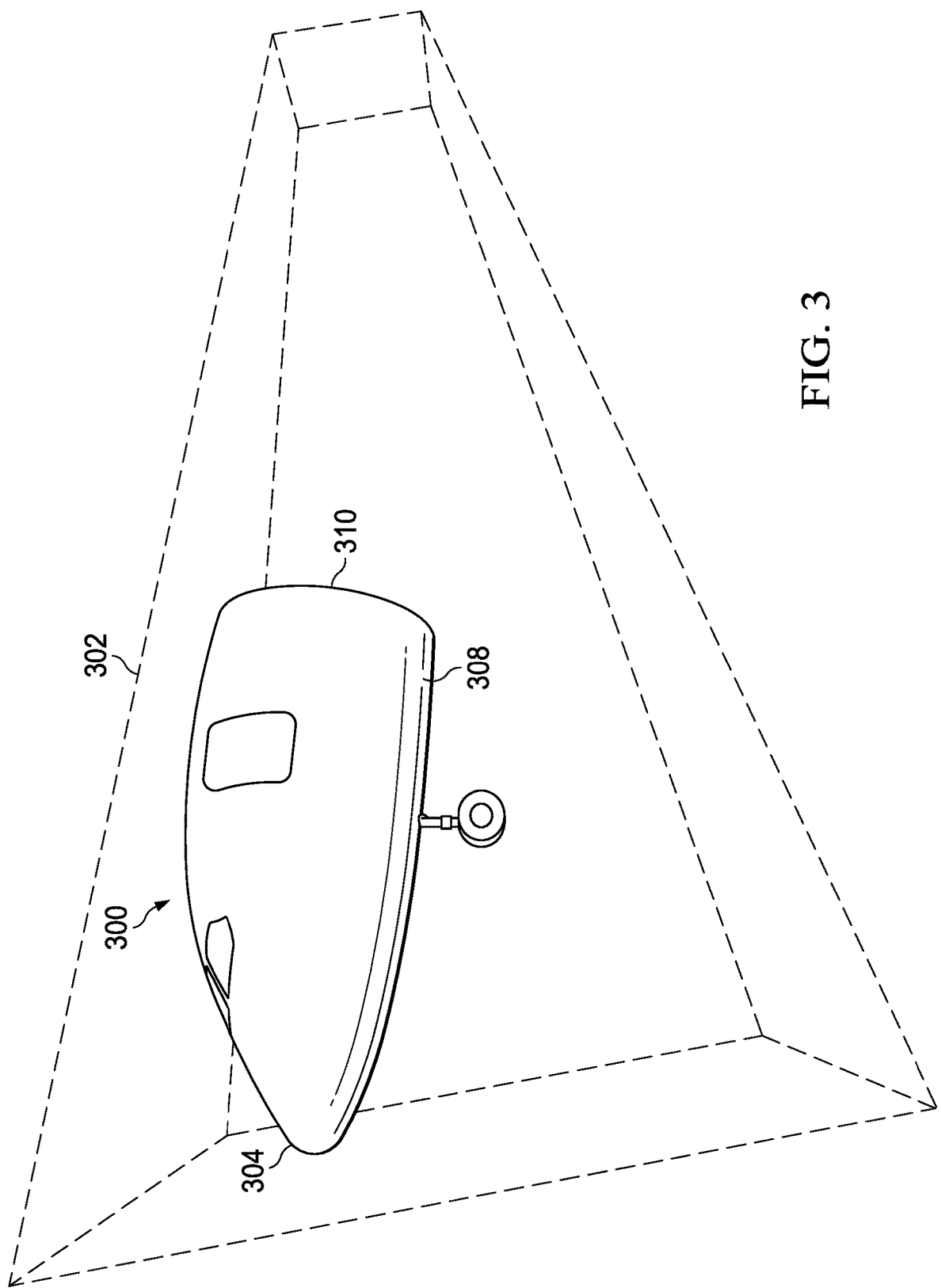
FIG. 3 is an illustration of a model of an aircraft structure in a defined coordinate cube in accordance with an illustrative embodiment.

With reference now to FIG. 3, an illustration of a model of an aircraft structure in a defined coordinate cube is depicted in accordance with an illustrative embodiment. In this illustrative example, model 300 is displayed located within defined coordinate cube 302.

In this example, model 300 represents a portion of an aircraft. In this example, model 300 includes nose 304 and portion 308 of fuselage 310. In this example, model 300 is an example of a model generated using a point cloud representation of a portion of the aircraft.

For example, model 300 can be generated by extracting geometry and other information from the computer-aided design model of the aircraft. The portions of the computer-aided design model extracted from model 300 can be based on the point cloud representation of the aircraft. In this illustrative example, model 300 can also be a computer-aided design (CAD) model.

Figure 4:
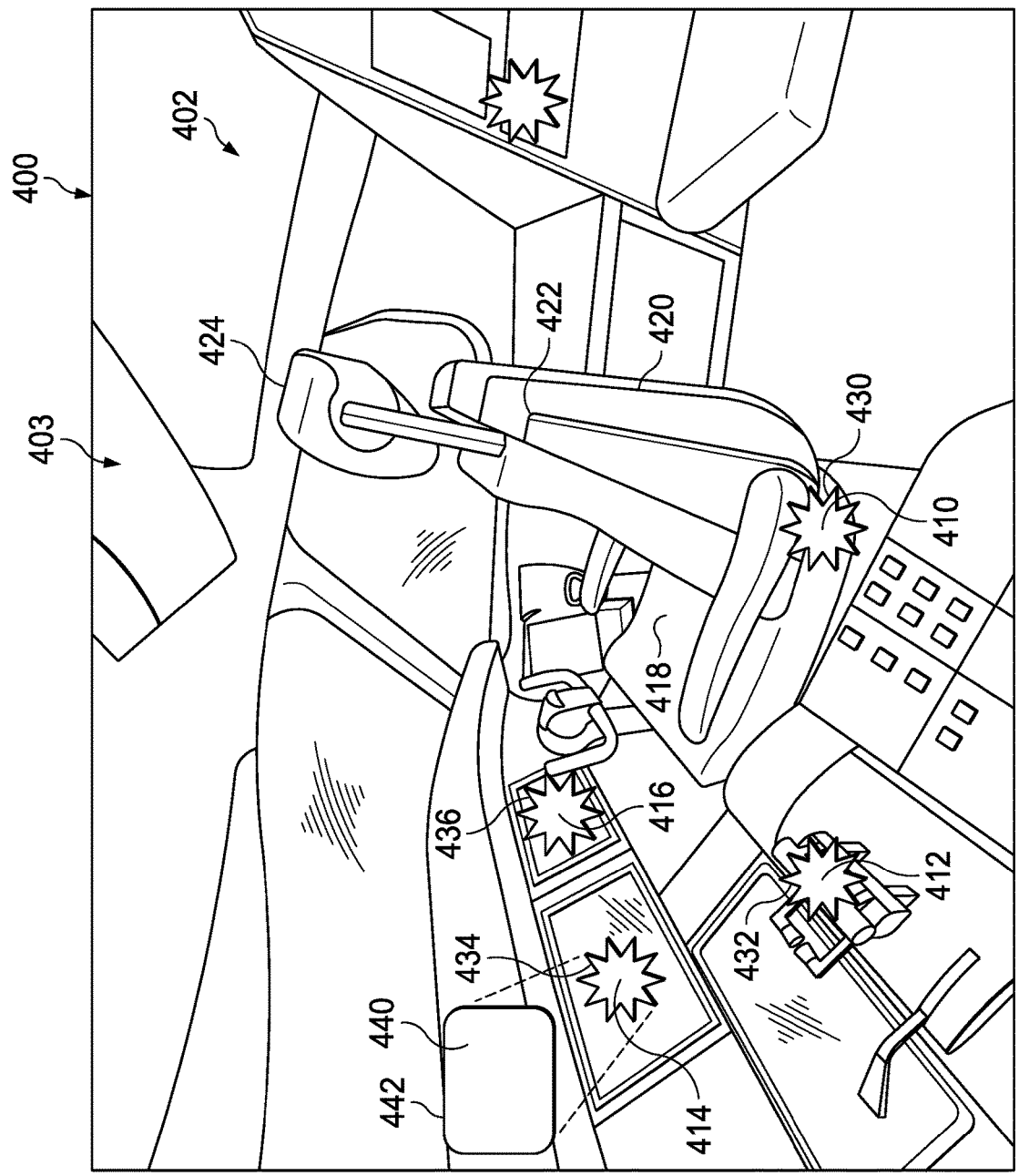
FIG. 4 is an illustration of an image of a flight deck augmented to indicate nonconformance locations in accordance with an illustrative embodiment.

With reference now to FIG. 4, an illustration of an image of a flight deck augmented to indicate nonconformance locations is depicted in accordance with an illustrative embodiment. In the illustrative examples, the same reference numeral may be used in more than one figure. This reuse of a reference numeral in different figures represents the same element in the different figures.

In this illustrative example, image 400 illustrates flight deck 402 in aircraft 403. Image 400 is an example of image 238 displayed by portable computing device 214 on display system 226 in FIG. 2, which is a live view of flight deck 402. In this illustrative example, flight deck 402 in aircraft 403 is modeled in model 300 in FIG. 3.

In this illustrative example, nonconformance locations are present in flight deck 402. In this example, these nonconformance locations include nonconformance location 410, nonconformance location 412, nonconformance location 414, nonconformance location 416, nonconformance location 418, nonconformance location 420, and nonconformance location 422. These nonconformance locations can be identified from nonconformance data and model 300 which includes details for flight deck 402.

The live view of flight deck 402 in image 400 is augmented with graphical indicators to indicate the presence of nonconformances. In this illustrative example, nonconformances that are visible in image 400 are augmented with graphical indicators while nonconformances that are obscured in image 400 are not identified using graphical indicators.

As depicted, nonconformance location 410, nonconformance location 412, nonconformance location 414, and nonconformance location 416 are visible in image 400. However, nonconformance location 418, nonconformance location 420, and nonconformance location 422 are obscured. In this depicted example these nonconformance locations are obscured by chair 424 in this view of flight deck 402 in image 400.

In this illustrative example, the visible nonconformance locations are identified in image 400 by augmenting the live view of an image 400 with graphical indicators to identify the nonconformance locations. In this example, the graphical indicators are starbursts. As depicted, nonconformance location 410 is indicated using starburst 430; nonconformance location 412 is indicated using starburst 432; nonconformance location 414 is indicated using starburst 434; and nonconformance location 416 is indicated using starburst 436. Graphical indicators are not displayed on image 400 for nonconformance location 418, nonconformance location 420, and nonconformance location 422 because these locations are obscured from this view of flight deck 402.

In this illustrative example, selecting a graphical indicator can result in the display of additional information about nonconformances. For example, selection of the starburst 434 for nonperformance location 414 results in the display of nonconformance data 440 in window 442. Nonconformance data 440 can take a number of different forms. For example, nonconformance data 440 can include at least one of a description of the nonconformance, instructions for resolving the nonconformance, a three point location of the nonconformance, a work order, an image, links to addition information, or other suitable information.

When the position of portable computing device 214 changes, nonconformance locations that are visible and nonconformance locations that are obscured can change. These changes can be identified by displaying graphical indicators for the visible nonconformance locations on the new image of flight deck 402.

Figure 5:
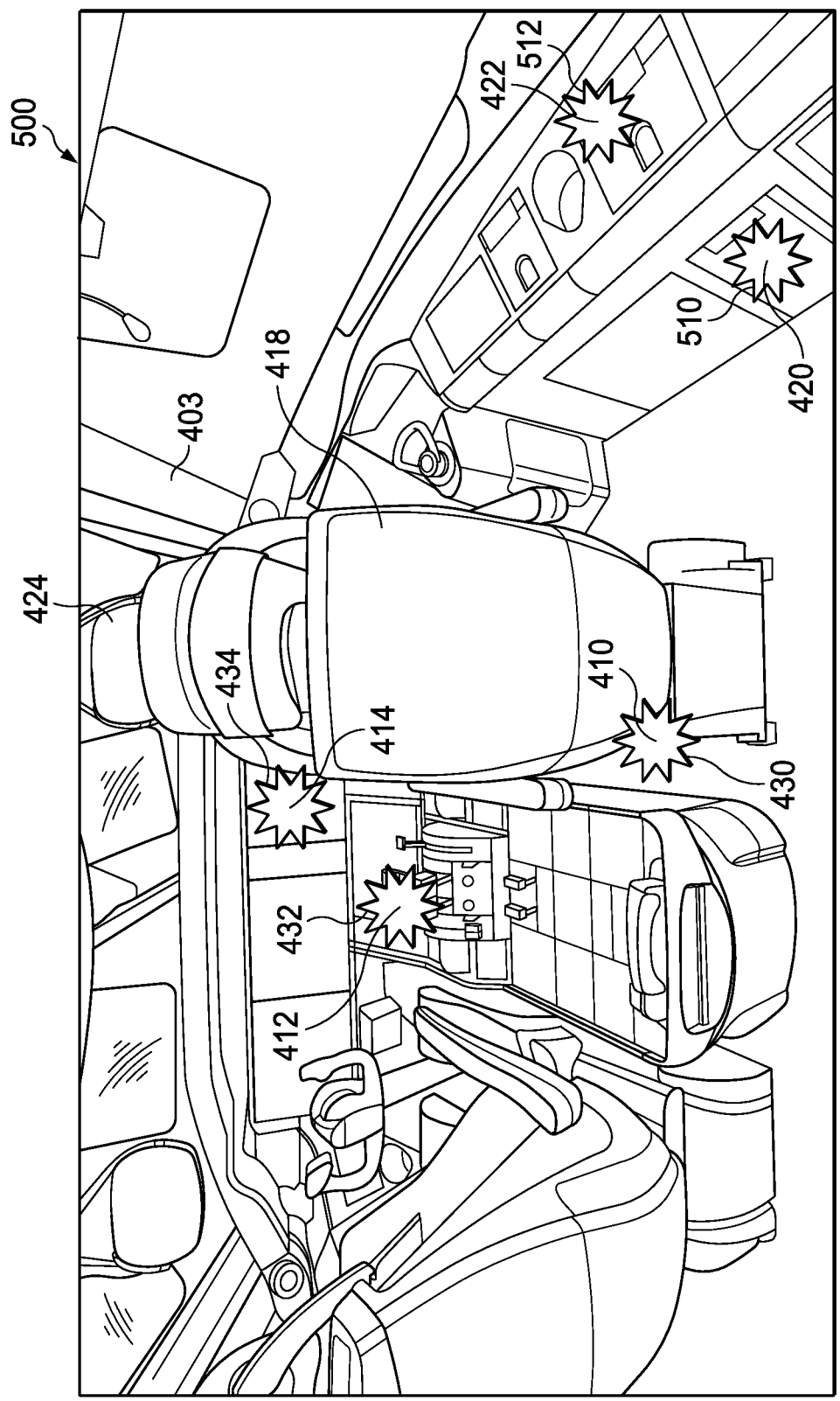
FIG. 5 is an illustration of an image of a flight deck augmented to indicate nonconformance locations in accordance with an illustrative embodiment.

With reference now to FIG. 5, an illustration of an image of a flight deck augmented to indicate nonconformance locations is depicted in accordance with an illustrative embodiment.

In this figure, image 500 is a live view of flight deck 402 in which portable computing device 214 has changed positions. As depicted, nonconformance location 410, nonconformance location 412, nonconformance location 414, nonconformance location 416, nonconformance location 418, nonconformance location 420, and nonconformance location 422 are in this view of flight deck 402 in image 500.

In this position, a change occurs in the visible nonconformance locations and obscured nonconformance locations. Nonconformance location 410, nonconformance location 412, nonconformance location 414, nonconformance location 420, and nonconformance location 422 are visible in this view of flight deck 402 in image 500. Nonconformance location 416 and nonconformance location 418 are obscured in this view of flight deck 402 in image 500.

As a result, the live view of flight deck 402 in image 500 is augmented to indicate visible nonconformance locations in image 500. In this example, nonconformance location 410, nonconformance location 412, and nonconformance location 414 are still visible and are indicated using starburst 430, starburst 432, and starburst 434 respectively. Nonconformance location 420 has starburst 510, and nonconformance location 422 has starburst 512.

Figure 6:
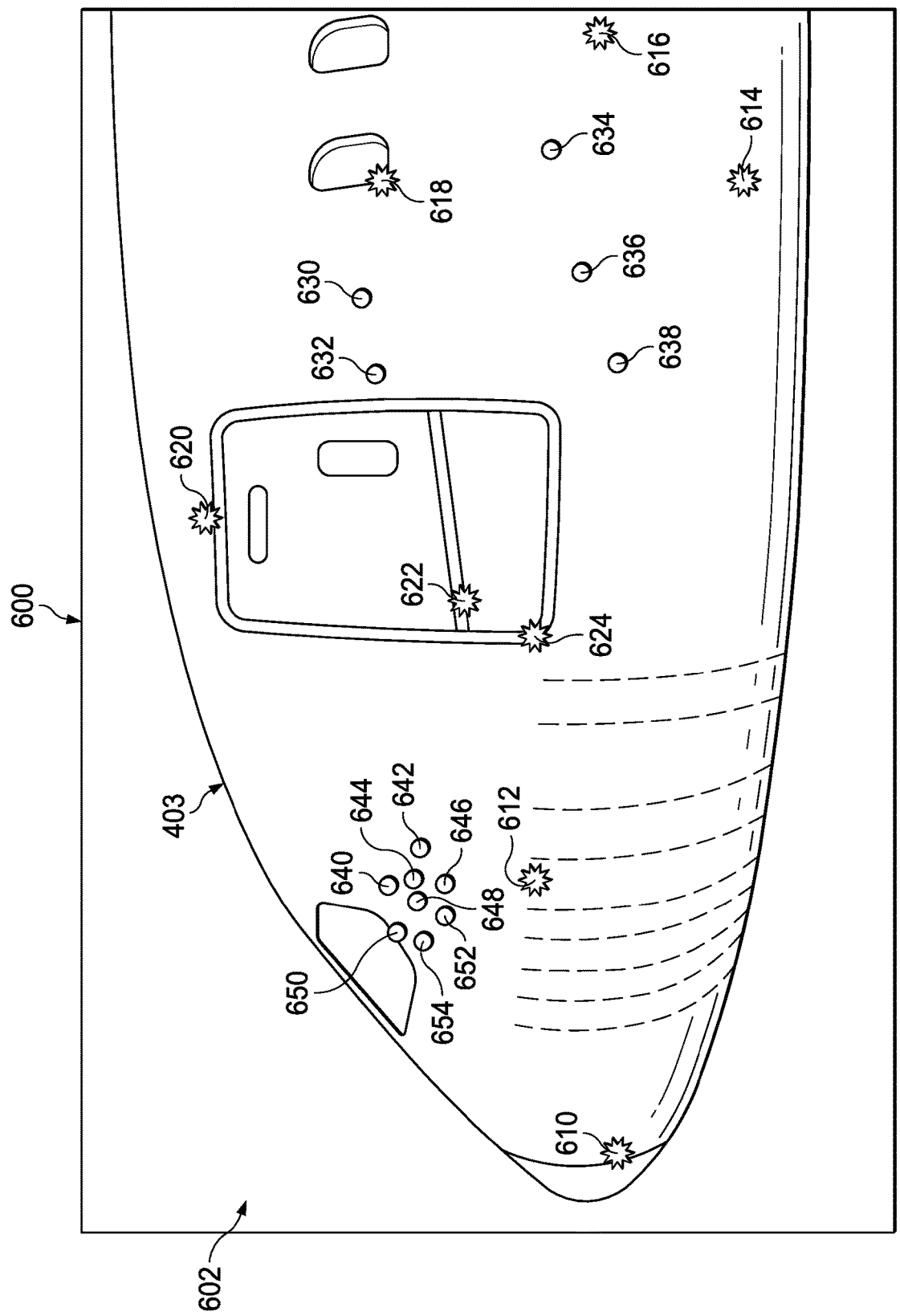
FIG. 6 is an illustration of a panoramic view of an aircraft in accordance with an illustrative embodiment.

With reference now to FIG. 6, an illustration of a panoramic view of an aircraft is depicted in accordance with an illustrative embodiment. A live exterior view aircraft 403 is depicted in image 600. Image 600 is another example of image 238 generated by portable computing device 214 in FIG. 2.

In this view, the position of portable computing device 214 is a selected distance from aircraft 403 that results in panoramic view 602 of aircraft 403. In this view, image 600 is augmented with graphical indicators show all nonconformance locations for aircraft 403 within image 600.

In this example, the graphical indicators indicate whether the nonconformances are visible on the exterior in the live view in image 600. In this example, graphical indicators in the form of starbursts indicate visible nonconformance locations. Graphical indicators in the form of circles indicate obscured nonconformance locations.

In this example, panoramic view 602 includes starburst 610, starburst 612, starburst 614, starburst 616, starburst 618, starburst 620, starburst 622, starburst 624 to indicate nonconformance locations that are visible in this view of aircraft 403 in image 600.

As depicted, nonconformance locations that are obscured in this view of aircraft 403 in image 600 comprise circle 630, circle 632, circle 634, circle 636, circle 638, circle 640, circle 642, circle 644, circle 646, circle 648, circle 650, circle 652, and circle 654.

In this manner, human operators are able to identify which nonconformance locations are actually visible in the live view of aircraft 403 in image 600.

Figure 7:
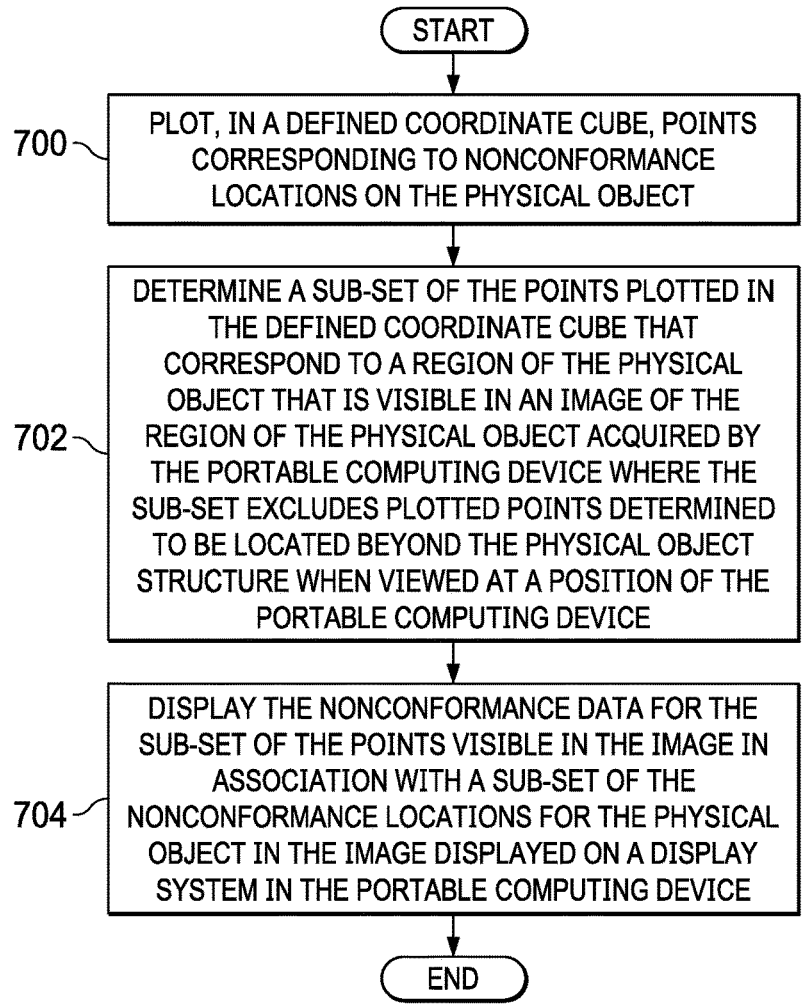
FIG. 7 is an illustration of a flowchart of a process for visualizing nonconformance data for a physical object in accordance with an illustrative embodiment.

Turning next to FIG. 7, a flowchart of a process for visualizing nonconformance data for a physical object is depicted in accordance with an illustrative embodiment. The process in FIG. 7 can be implemented in hardware, software, or both. When implemented in software, the processes can take the form of program code that is run by one or more processor units located in one or more hardware devices in one or more computer systems. For example, these processes can be implemented in tablet computer 108 in FIG. 1 or portable computing device 214 in FIG. 2. These processes can be implemented in an augmented reality application located in one of these computing systems.

The process begins by plotting, in a defined coordinate cube, points corresponding to nonconformance locations on the physical object (operation 700). In operation 700, the defined coordinate cube defines a region of the physical object that is modeled.

In an illustrative example, the defined coordinate cube may contain all or part of a physical object. The selection of how much of the physical object is modeled pends on processing resources available for the amounts of data that is generated for the model of the physical object.

The process determines a sub-set of the points plotted in the defined coordinate cube that correspond to a region of the physical object that is visible in an image of the region of the physical object acquired by the portable computing device where the sub-set excludes plotted points determined to be located beyond the physical object structure when viewed at a position of the portable computing device (operation 702). The sub-set of the points exclude nonconformance locations that are occluded from view by structure of the physical object in the image. One manner in which operation 702 can be implemented includes determining which of remaining points for the nonconformance locations are to be occluded by determining the distance of each nonconformance location from the physical object structure displayed in the image that is beyond the predetermined distance that corresponds to a nonconformance location being occluded from view.

The process displays the nonconformance data for the sub-set of the points visible in the image in association with a sub-set of the nonconformance locations for the physical object in the image displayed on a display system in the portable computing device (operation 704). The process terminates thereafter.

Figure 8:
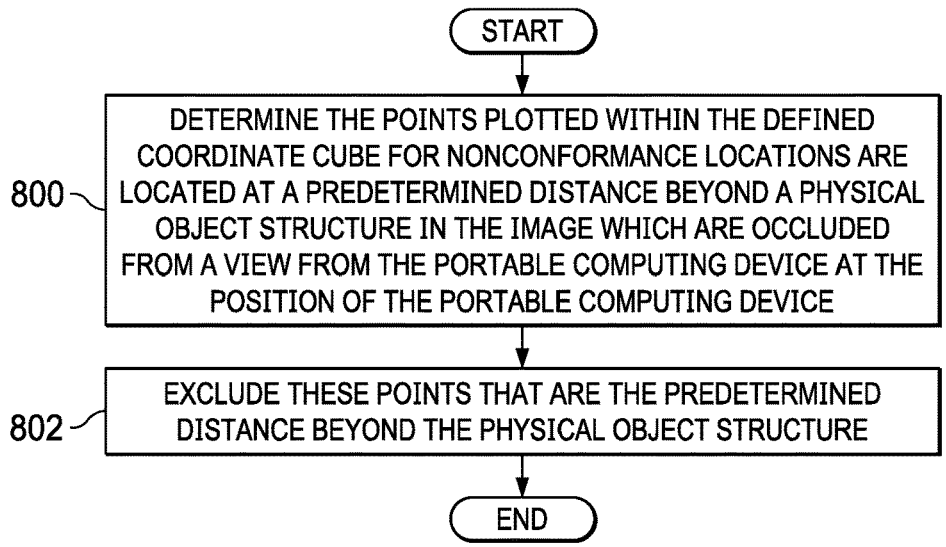
FIG. 8 is an illustration of a flowchart of a process for determining a subset of points in accordance with an illustrative embodiment.

With reference next to FIG. 8, an illustration of a flowchart of a process for determining a subset of points is depicted in accordance with an illustrative embodiment. The process illustrated in FIG. 8 is an example of one implementation for operation 702 in FIG. 7 in which a subset of points for nonconformance locations that are visible to the portable computing device in the current position of the portable computing device is identified.

The process begins by determining the points plotted within the defined coordinate cube for nonconformance locations are located at a predetermined distance beyond a physical object structure in the image which are occluded from a view from the portable computing device at the position of the portable computing device (operation 800). The process excludes these points that are the predetermined distance beyond the physical object structure (operation 802). The remaining points form the sub-set of the points. The process terminates thereafter.

Figure 9:
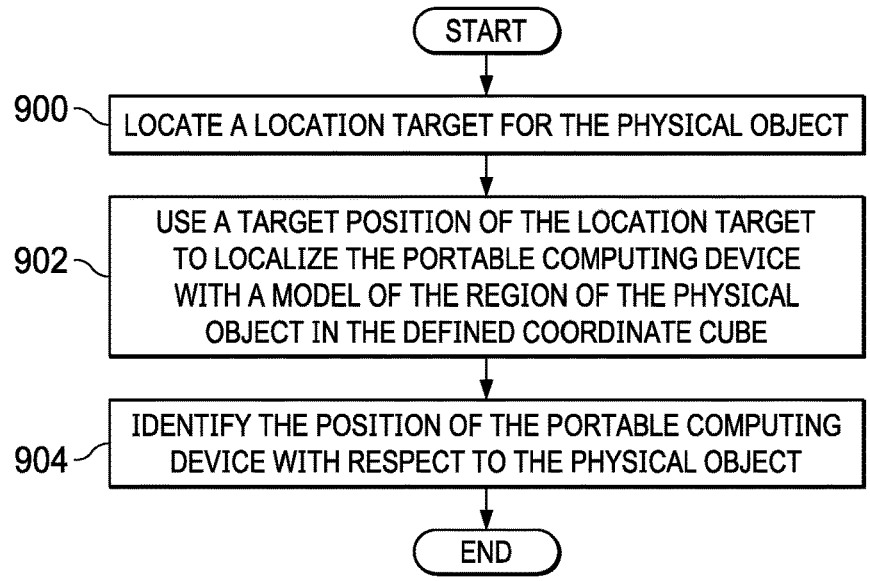
FIG. 9 is an illustration of a flowchart of a process for identifying a position of a portable computing device in accordance with an illustrative embodiment.

Turning next to FIG. 9, an illustration of a flowchart of a process for identifying a position of a portable computing device is depicted in accordance with an illustrative embodiment. The process in FIG. 9 can be implemented in hardware, software, or both. When implemented in software, the processes can take the form of program code that is run by one of more processor units located in one or more hardware devices in one or more computer systems. For example, these processes can be implemented in tablet computer 108 in FIG. 1 or localization application 222 in FIG. 2 which can run on at least one of portable computing device 214 or computer system 216 in FIG. 2. These processes can be implemented in an augmented reality application located in one of these computing systems.

The process begins by locating a location target for the physical object (operation 900). The location target can be a specific physical object structure. For example, the location target can be a bar code, a plate, a portal, a doorway, or some other suitable structure in the physical object. This location target has a known position in the physical object as well as a corresponding position in a model of the physical object.

The process uses a target position of the location target to localize the portable computing device with a model of the region of the physical object in the defined coordinate cube (operation 902).

The process identifies the position of the portable computing device with respect to the physical object (operation 904). The process terminates thereafter.

Figure 10:
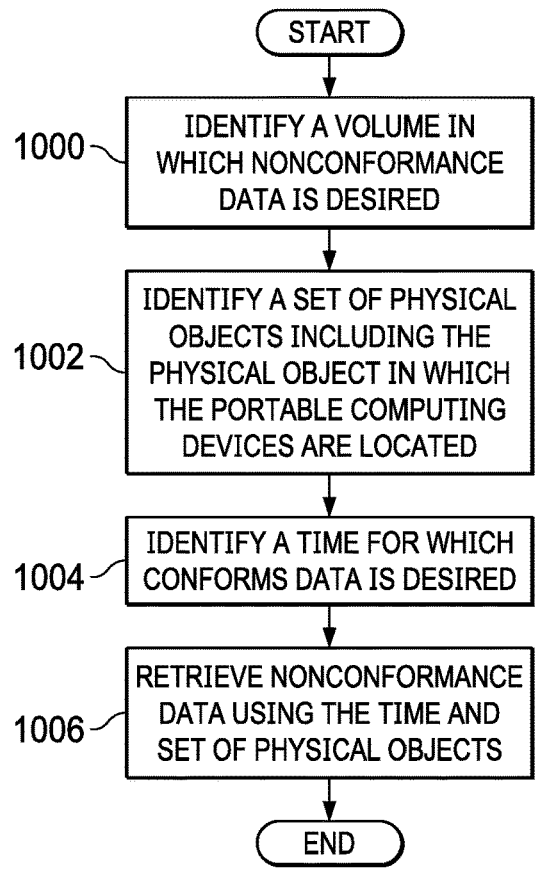
FIG. 10 is an illustration of a flowchart of a process for filtering nonconformance data in accordance with an illustrative embodiment.

With reference to FIG. 10, an illustration of a flowchart of a process for filtering nonconformance data is depicted in accordance with an illustrative embodiment. The process in FIG. 10 can be implemented in hardware, software, or both. When implemented in software, the processes can take the form of program code that is run by one of more processor units located in one or more hardware devices in one or more computer systems. For example, these processes can be implemented in at least one of tablet computer 108 or server computer 110 in FIG. 1 or in at least one of portable computing device 214 or computer system 216 in FIG. 2. The process in FIG. 10 is an example of one manner in which nonconformance data can be selected for displaying on a portable computing device.

The process begins by identifying a volume in which nonconformance data is desired (operation 1000). In operation 1000, the volume can be a defined coordinate cube. The process identifies a set of physical objects including the physical object in which the portable computing devices are located (operation 1002). In operation 1002, a set of physical objects can include physical objects of the same type in addition to the physical object in which the portable computing device located. In this manner, nonconformance data can be retrieved for other physical objects of the same type. This type of retrieval allows for comparison of nonconformances across different physical objects of the same type. For example, objects of the same type may be all physical objects on the particular line or manufacturing facility.

The process also identifies a time for which conforms data is desired (operation 1004). This time can be a current time in which the nonconformance data is for the physical object which nonconformances are currently present. In another illustrative example, the time can be a range of time that encompasses nonconformances that may have been resolved for the physical object.

The process then retrieves nonconformance data using the time and set of physical objects (operation 1006). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
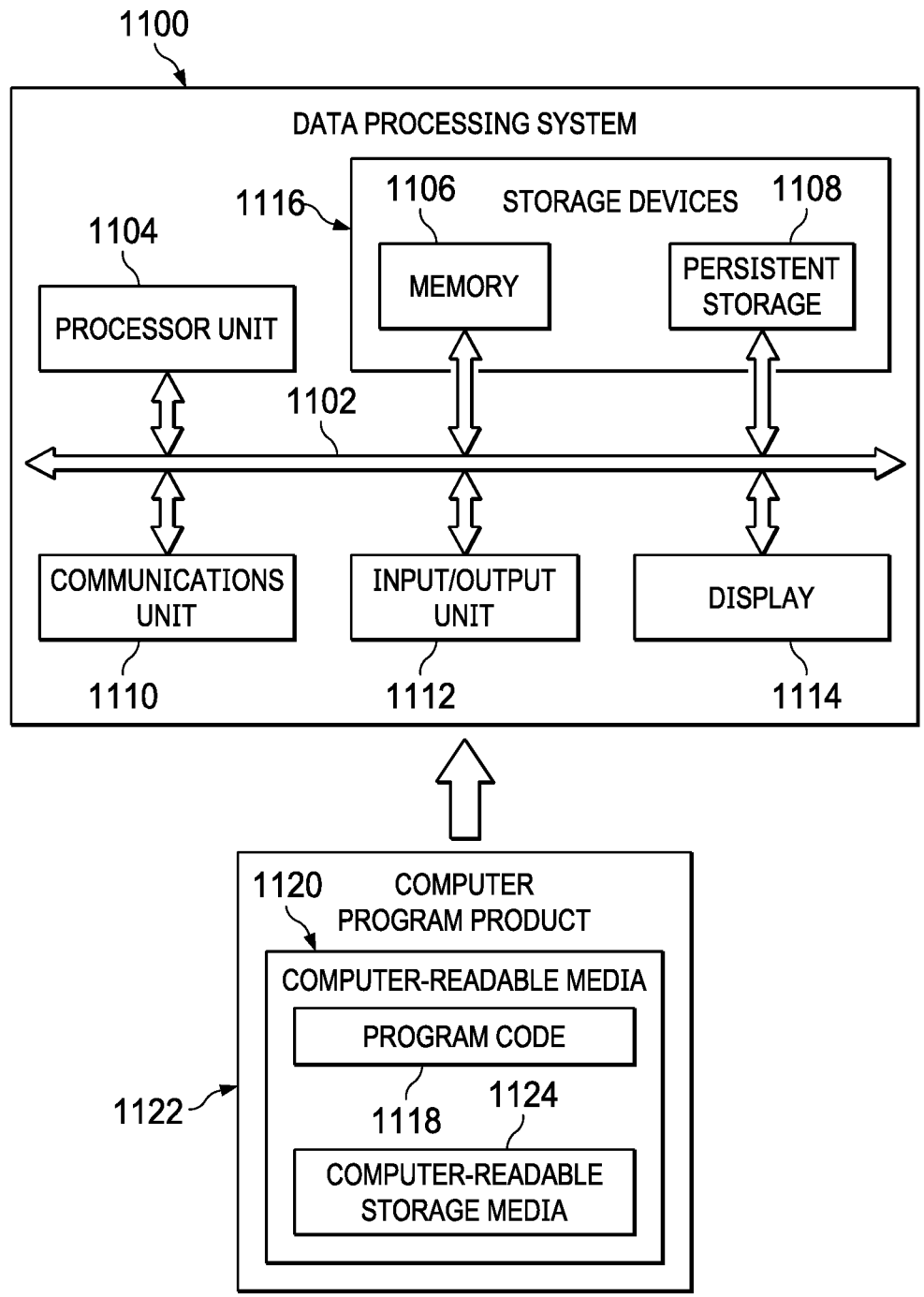
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 can be used to implement tablet computer 108 and server computer 110 in FIG. 1. Data processing system 1100 can also be used to implement portable computing device 214 and computer system 216 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1100 are not meant to provide architectural limitations to the manner in which different embodiments can be implemented. In some illustrative examples, one or more of the components may be incorporated in, or otherwise form a portion of, another component. For example, the memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Figure 12:
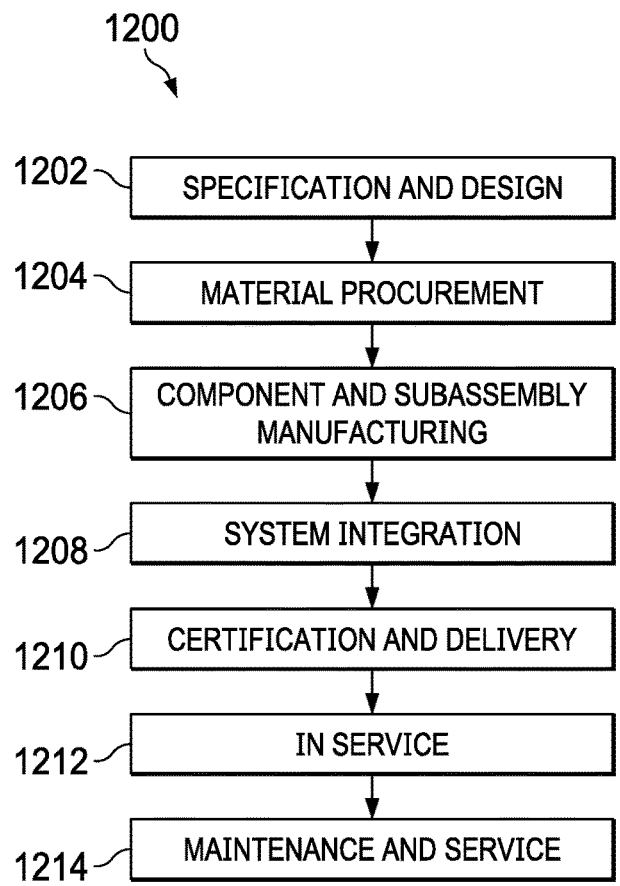
FIG. 12 is an illustration of a block diagram of an aircraft manufacturing and service method in accordance with an illustrative embodiment.
Figure 13:
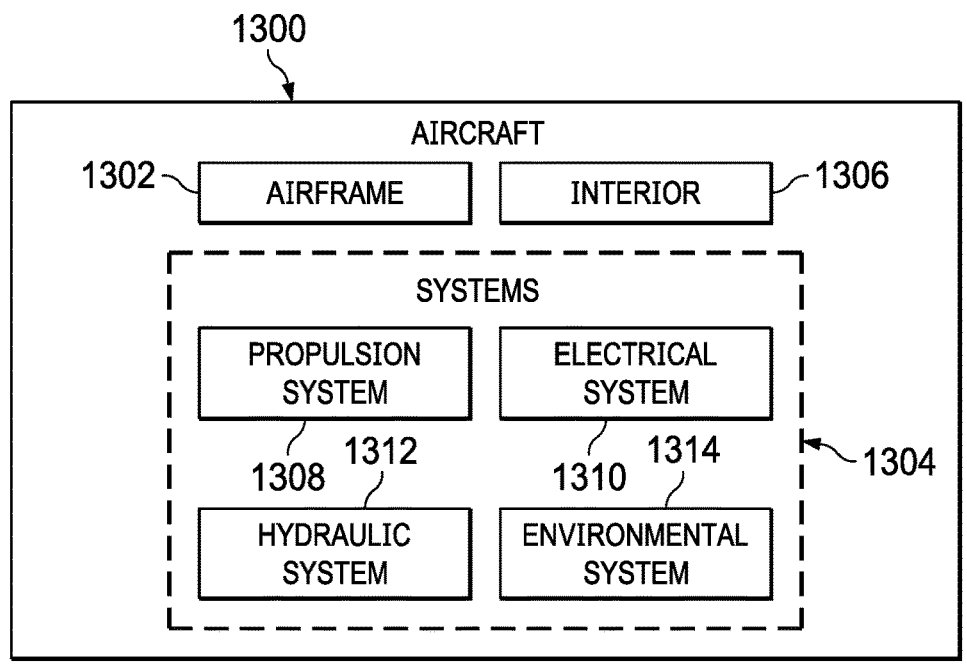
FIG. 13 is an illustration of a block diagram of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of a block diagram of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of a block diagram of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12. One or more apparatus embodiments, method embodiments, or a combination thereof may be utilized while aircraft 1300 is in service 1212, during maintenance and service 1214 in FIG. 12, or both. For example, augmented reality system 212 in FIG. 2 can be used during component and subassembly manufacturing 1206 and system integration 1208 to visualize nonconformances that may be present in parts or assemblies in aircraft 1300 at a phase of manufacturing. Additionally, augmented reality system 212 can also be used to locate nonconformances during maintenance and service 1214.

The use of a number of the different illustrative embodiments may substantially expedite the assembly of aircraft 1300, reduce the cost of aircraft 1300, or both expedite the assembly of aircraft 1300 and reduce the cost of aircraft 1300. The use of augmented reality system 212 in FIG. 2 reduce the time needed to find nonconformance locations through augmenting the live view of aircraft 1300 or parts or assemblies for aircraft 1300. Additionally, augmented reality system 212 can also augment a live view with nonconformance data in addition to locations of nonconformances.

Figure 14:
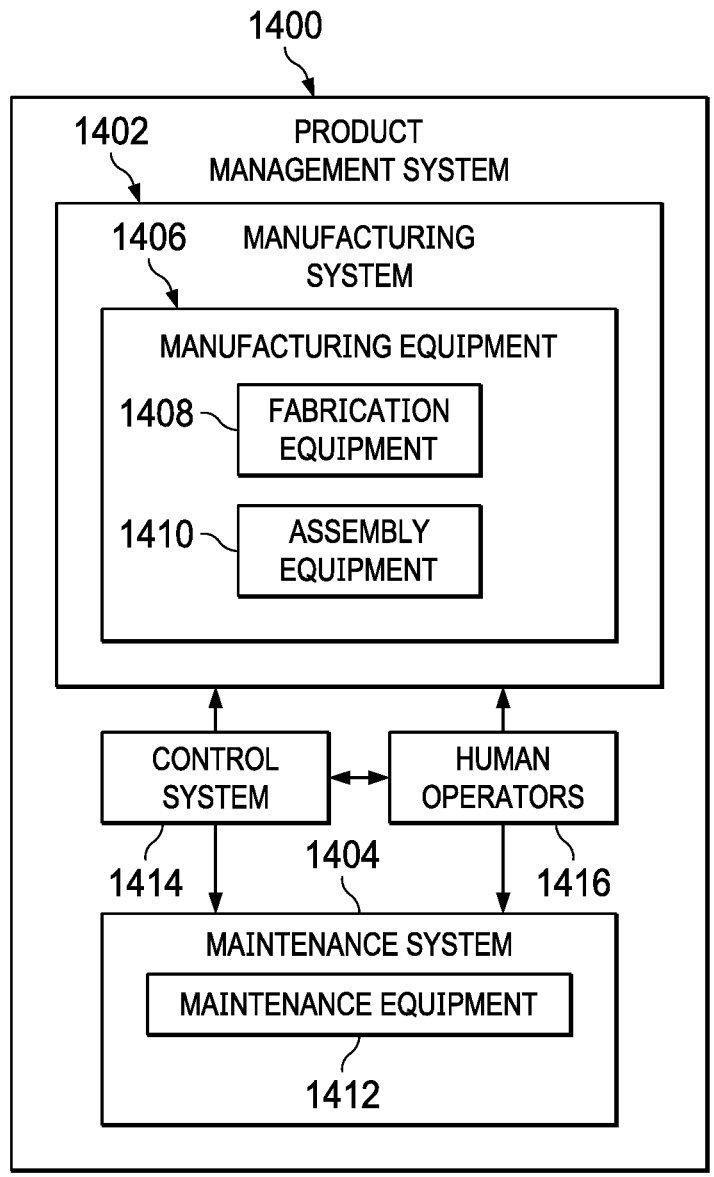
FIG. 14 is an illustration of a block diagram of a product management system in accordance with an illustrative embodiment.

Turning now to FIG. 14, an illustration of a block diagram of a product management system is depicted in accordance with an illustrative embodiment. Product management system 1400 is a physical hardware system. In this illustrative example, product management system 1400 may include at least one of manufacturing system 1402 or maintenance system 1404.

Manufacturing system 1402 is configured to manufacture products, such as aircraft 1300 in FIG. 13. As depicted, manufacturing system 1402 includes manufacturing equipment 1406. Manufacturing equipment 1406 includes at least one of fabrication equipment 1408 or assembly equipment 1410.

Fabrication equipment 1408 is equipment that may be used to fabricate components for parts used to form aircraft 1300 in FIG. 13. For example, fabrication equipment 1408 may include machines and tools. These machines and tools may be at least one of a drill, a hydraulic press, a furnace, a mold, a composite tape laying machine, a vacuum system, a lathe, or other suitable types of equipment. Fabrication equipment 1408 may be used to fabricate at least one of metal parts, composite parts, semiconductors, circuits, fasteners, ribs, skin panels, spars, antennas, or other suitable types of parts.

Assembly equipment 1410 is equipment used to assemble parts to form aircraft 1300 in FIG. 13. In particular, assembly equipment 1410 may be used to assemble components and parts to form aircraft 1300 in FIG. 13. Assembly equipment 1410 also may include machines and tools. These machines and tools may be at least one of a robotic arm, a crawler, a faster installation system, a rail-based drilling system, or a robot. Assembly equipment 1410 may be used to assemble parts such as seats, horizontal stabilizers, wings, engines, engine housings, landing gear systems, and other parts for aircraft 1300 in FIG. 13.

In this illustrative example, maintenance system 1404 includes maintenance equipment 1412. Maintenance equipment 1412 may include any equipment needed to perform maintenance on aircraft 1300 in FIG. 13. Maintenance equipment 1412 may include tools for performing different operations on parts on aircraft 1300 in FIG. 13. These operations may include at least one of disassembling parts, refurbishing parts, inspecting parts, reworking parts, manufacturing replacement parts, or other operations for performing maintenance on aircraft 1300 in FIG. 13. These operations may be for routine maintenance, inspections, upgrades, refurbishment, or other types of maintenance operations.

In the illustrative example, maintenance equipment 1412 may include ultrasonic inspection devices, x-ray imaging systems, vision systems, drills, crawlers, and other suitable device. In some cases, maintenance equipment 1412 may include fabrication equipment 1408, assembly equipment 1410, or both to produce and assemble parts that may be needed for maintenance.

Product management system 1400 also includes control system 1414. Control system 1414 is a hardware system and may also include software or other types of components. Control system 1414 is configured to control the operation of at least one of manufacturing system 1402 or maintenance system 1404. In particular, control system 1414 may control the operation of at least one of fabrication equipment 1408, assembly equipment 1410, or maintenance equipment 1412.

The hardware in control system 1414 may be implemented using hardware that may include computers, circuits, networks, and other types of equipment. The control may take the form of direct control of manufacturing equipment 1406. For example, robots, computer-controlled machines, and other equipment may be controlled by control system 1414. In other illustrative examples, control system 1414 may manage operations performed by human operators 1416 in manufacturing or performing maintenance on aircraft 1300. For example, control system 1414 may assign tasks, provide instructions, display models, or perform other operations to manage operations performed by human operators 1416. In these illustrative examples, augmented reality system 212 in FIG. 2 can be implemented in control system 1414 to manage at least one of the manufacturing or maintenance of aircraft 1300 in FIG. 13.

For example, augmented reality system 212 can be used by human operators 1416 to obtain about nonconformances.

For example, portable computing device 214 in augmented reality system 212 can augment live views of parts, assemblies, or product during a phase of manufacture.

The augmentation can be used to enable human operators 1416 to locate nonconformance locations in less time. Further, the augmentation can also be used to provide information and instructions to human operators 1416 in controlling at least one of manufacturing maintenance of aircraft 1300 in FIG. 13.

In the different illustrative examples, human operators 1416 may operate or interact with at least one of manufacturing equipment 1406, maintenance equipment 1412, or control system 1414. This interaction may be performed to manufacture aircraft 1300 in FIG. 13.

Of course, product management system 1400 may be configured to manage other products other than aircraft 1300 in FIG. 13. Although product management system 1400 has been described with respect to manufacturing in the aerospace industry, product management system 1400 may be configured to manage products for other industries. For example, product management system 1400 can be configured to manufacture products for the automotive industry as well as any other suitable industries.

Thus, the illustrative example provides an augmented reality system that enables a human operator to identify the locations of nonconformances on a physical object such as an aircraft during a phase of manufacture. The illustrative examples combine three-dimensional point cloud generation, simultaneous location mapping processes, and data about nonconformances to provide a human operator operating a portable computing device information based on a relative position of the portable computing device to physical object.

In this manner, nonconformances that are often difficult to see in defined physical local coordinate systems such as those in aircraft can be visualized using augmented reality system 212 in FIG. 2. In the illustrative example, augmented reality utilizes three-dimensional scanner techniques to generate a point cloud model. The point of model identifies a position of a portable computing device with respect to a reference point using simultaneous location and mapping (SLAM) processes that are currently available. A database of nonconformance data is accessed to provide nonconformance information for nonconformances that are visible in a live view from a portable computing device.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An augmented reality system configured to visualize nonconformance data for a physical object, such that the augmented reality system comprises:
    a portable computing device that comprises a sensor system and a display system, such that the portable computing device and the sensor system are configured to generate scan data that describes points in space for the physical object at a phase of manufacture;
    a scan application configured to generate a point cloud representation of a surface profile of a region of the physical object based upon the scan data;
    a modeling application that, when executed, generates a model of the region of the physical object in a defined coordinate cube using the point cloud representation for the region of the physical object;
    a localization application that, when executed, localizes the portable computing device with the model of the region of the physical object in the defined coordinate cube based on a location target, and identifies a position of the portable computing device with respect to the physical object; and
    an augmented reality application configured such that, when executed the augmented reality application:
        plots points in the defined coordinate cube corresponding to nonconformance locations on the physical object;
        determines a sub-set of points plotted in the defined coordinate cube that are visible in an image of the region of the physical object acquired by the portable computing device where the sub-set excludes points determined to be located at a predetermined distance beyond a physical object structure in the image when viewed at the position of the portable computing device and thus occluded from a view from the position of the portable computing device; and
        displays the nonconformance data for the sub-set of points visible in the image in association with a sub-set of the nonconformance locations on the physical object in the image displayed on the display system in the portable computing device.

2. The augmented reality system of claim 1, wherein in displaying the nonconformance data for the sub-set of the points plotted in the defined coordinate cube that are visible in the image in association with the sub-set of the nonconformance locations on the physical object in the image displayed on the display system in the portable computing device, the augmented reality application displays the nonconformance data for the sub-set of the points visible in the image in association with the sub-set of the nonconformance locations on the physical object in the image displayed on the display system in the portable computing device without displaying the nonconformance data for the nonconformance locations on the physical object that are occluded from view in the image of the region of the physical object.

3. The augmented reality system of claim 1, wherein the physical object is an aircraft structure and wherein in determining the sub-set of the points plotted in the defined coordinate cube that are visible in an image of the region of the physical object acquired by the portable computing device at the position of the portable computing device, the augmented reality application determines a distance of each nonconformance location from the aircraft structure displayed that is beyond a predetermined distance that corresponds to the nonconformance location being occluded from view.

4. The augmented reality system of claim 1, wherein in localizing the portable computing device with the model of the region of the physical object in the defined coordinate cube and identifying a position of the portable computing device with respect to the physical object, the localization application locates a location target for the physical object, uses a target position of the location target to localize the portable computing device with the model of the region of the physical object in the defined coordinate cube, and identifies the position of the portable computing device with respect to the physical object.

5. The augmented reality system of claim 1, further comprising the augmented reality application configured to:
determine whether the portable computing device is greater than a selected distance for a panoramic view; and
display the points for all of the nonconformance locations in the defined coordinate cube to provide a panoramic view of all of the nonconformance locations.

6. The augmented reality system of claim 1, further comprising the augmented reality application configured to filter the nonconformance data based on time information to display at least one of historical nonconformance data or active nonconformance data.

7. The augmented reality system of claim 1, wherein the nonconformance data for the sub-set of the points is live nonconformance data.

8. The augmented reality system of claim 1 further comprising:
the portable computing device comprising an interface configured to receive the nonconformance locations on the physical object.

9. The augmented reality system of claim 1, wherein the sensor system comprises at least one of a three-dimensional scanner, a camera, a global positioning system receiver, structured light three-dimensional scanner, a lidar system, a laser scanner, a conoscopic holograph system, or a time of flight three-dimensional scanner.

10. The augmented reality system of claim 1, wherein the portable computing device is selected from a group comprising a mobile phone, a tablet computer, a head mounted device, and smart glasses.

11. The augmented reality system of claim 1, wherein the physical object is selected from a group comprising a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, an aircraft structure, a wing, a fuselage section, an engine housing, an engine, a composite panel, a wall, a skin panel, and a chair.

12. An augmented reality system configured to visualize nonconformance data for a physical object such that the augmented reality system comprises:
a portable computing device configured to acquire an image of a physical object;
an augmented reality application configured to execute the following:
plot points in a defined coordinate cube, wherein the points correspond to nonconformance locations on the physical object;
determine a sub-set of the points plotted in the defined coordinate cube that correspond to a region of the physical object that is visible in the image acquired by the portable computing device at a position of the portable computing device,
wherein the sub-set of the points excludes plotted points determined to be located at a predetermined distance beyond a physical object structure in the image when viewed at the position of the portable computing device and thus occluded from a view from the position of the portable computing device by the physical object structure of the physical object in the image; and
display the nonconformance data for the sub-set of the points visible in the image in association with a sub-set of the nonconformance locations for the physical object in the image displayed on a display system in the portable computing device.

13. The augmented reality system of claim 12, further comprising:
the portable computing device comprising a sensor system that is configured to generate scan data that describes points in space for the physical object at a phase of manufacture;
a scan application configured to generate a point cloud representation of a surface profile of a region of the physical object using the scan data;
a modeling application configured to generate a model of the region of the physical object in the defined coordinate cube using the point cloud representation for the region of the physical object;
a localization application configured to:
localize the portable computing device with the model of the region of the physical object in the defined coordinate cube based on a location target; and
identify a position of the portable computing device with respect to the physical object.

14. The augmented reality system of claim 13 further comprising:
a computer system, wherein at least one of the scan application, the modeling application, and the localizing application are located in the computer system.

15. The augmented reality system of claim 13, wherein at least one of the scan application, the modeling application, and the localization application are located in the portable computing device.

16. A method for visualizing nonconformance data for a physical object, the method comprising:
plotting in a defined coordinate cube, by an augmented reality application in a portable computing device, points corresponding to nonconformance locations on the physical object;
determining, by the augmented reality application in the portable computing device, a sub-set of the points plotted in the defined coordinate cube that correspond to a region of the physical object that is visible in an image of the region of the physical object acquired by the portable computing device such that the sub-set excludes plotted points determined to be located beyond a predetermined distance that corresponds to a nonconformance location being occluded from view from a physical object structure in the image when viewed at a position of the portable computing device, where the sub-set of the points exclude nonconformance locations that are occluded from the view from the portable computing device by the physical object structure of the physical object in the image; and
displaying, by the augmented reality application in the portable computing device, the nonconformance data for the sub-set of the points visible in the image in association with a sub-set of the nonconformance locations for the physical object in the image displayed on a display system in the portable computing device.

17. The method of claim 16, determining step comprises:
determining, by the augmented reality application in the portable computing device, the points plotted within the defined coordinate cube for nonconformance locations are located at the predetermined distance beyond the physical object structure in the image which are occluded from a view from the portable computing device at the position; and
excluding, by the augmented reality application in the portable computing device, these points that are the predetermined distance beyond the physical object structure, wherein remaining points form the sub-set of the points.

18. The method of claim 16 further comprising:
locating a location target for the physical object;
using a target position of the location target to localize the portable computing device with a model of the region of the physical object in the defined coordinate cube based on a location target; and
identifying the position of the portable computing device with respect to the physical object.

19. The method of claim 16, wherein the displaying step comprises:
displaying, by an augmented reality application in a portable computing device, the nonconformance data for the sub-set of the points visible in the image in association with the sub-set of the nonconformance locations on the physical object in the image displayed on the display system in the portable computing device without displaying the nonconformance data for the nonconformance locations on the physical object that are occluded from view in the image of the region of the physical object.

20. The method of claim 16 further comprising:
determining whether the portable computing device is greater than a selected distance for a panoramic view; and
displaying the points for all of the nonconformance locations on the physical object in the defined coordinate cube to provide a panoramic view of all of the nonconformance locations.

21. The method of claim 16, further comprising:
the augmented reality application filtering the nonconformance data based on time information; and
displaying at least one of historical nonconformance data or active nonconformance data.

22. The method of claim 16, wherein the nonconformance data for the sub-set of the points is live nonconformance data.

23. The method of claim 16, wherein the portable computing device is selected from a group comprising a mobile phone, a tablet computer, a head mounted device, and smart glasses.

24. The method of claim 16, wherein the physical object is selected from a group comprising: a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, an aircraft structure, a wing, a fuselage section, an engine housing, an engine, a composite panel, a wall, a skin panel, and a chair.

* * * * *